(12) United States Patent
Nihei (10) Patent No.: US 10,120,318 B2
(45) Date of Patent: Nov. 6, 2018

(54) RECORDING MATERIAL FEEDING DEVICE WITH CONTROL OF MOTOR SPEED

(71) Applicant: CANON KABUSHIKI KAISHA, Tokyo (JP)

(72) Inventor: Hironobu Nihei, Yokohama-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/631,285

(22) Filed: Jun. 23, 2017

(65) Prior Publication Data

US 2017/0285551 A1    Oct. 5, 2017

Related U.S. Application Data

(62) Division of application No. 15/160,092, filed on May 20, 2016, now Pat. No. 9,731,525.

(30) Foreign Application Priority Data

May 27, 2015  (JP) .................................. 2015-107500
Mar. 23, 2016  (JP) .................................. 2016-058662

(51) Int. Cl.
*B65H 1/14*       (2006.01)
*B65H 1/18*       (2006.01)
(Continued)

(52) U.S. Cl.
CPC .......... *G03G 15/6552* (2013.01); *B41J 11/58* (2013.01); *B41J 13/0009* (2013.01);
(Continued)

(58) Field of Classification Search
CPC .... B65H 1/14; B65H 1/266; B65H 2601/521; B65H 2511/521; B65H 2403/72;
(Continued)

(56) References Cited

U.S. PATENT DOCUMENTS 8,041,285 B2    10/2011  Hashimoto et al.
8,297,613 B2    10/2012  Katayama
(Continued)

FOREIGN PATENT DOCUMENTS

CN    86100060 A    7/1986
CN    101221383 A   7/2008
(Continued)

OTHER PUBLICATIONS

Chinese Office Action issued in corresponding Chinese Application No. 201610346534.9 dated Sep. 1, 2017.

*Primary Examiner* — Luis A Gonzalez
(74) *Attorney, Agent, or Firm* — Fitzpatrick, Cella, Harper & Scinto (57) ABSTRACT

A recording material feeding device includes a stacking portion, a driving source, a holding member, a torque limiter for limiting transmission of a driving torque from the driving source to the stacking portion in a case that the driving source rotates in a state in which the holding member holds the position of the stacking portion; a storing portion for storing information on a holding state of the holding member; and a controller for controlling the driving source to rotate at a rotational speed slower when the information is information indicating that the holding member holds the position of the stacking portion than when the information is information indicating that the holding member does not hold the position of the stacking portion.

13 Claims, 9 Drawing Sheets

(51) Int. Cl.
*G03G 15/00* (2006.01)
*B41J 13/00* (2006.01)
*B41J 11/58* (2006.01)
*B65H 7/20* (2006.01)
*B65H 3/06* (2006.01)
*B65H 7/14* (2006.01)
*F16D 7/04* (2006.01)
*G06F 3/14* (2006.01)
*B65H 7/02* (2006.01)
*B65H 1/24* (2006.01)

(52) U.S. Cl.
CPC ............... *B65H 1/14* (2013.01); *B65H 1/18* (2013.01); *B65H 1/24* (2013.01); *B65H 3/0669* (2013.01); *B65H 3/0684* (2013.01); *B65H 7/02* (2013.01); *B65H 7/14* (2013.01); *B65H 7/20* (2013.01); *F16D 7/042* (2013.01); *F16D 7/044* (2013.01); *G06F 3/14* (2013.01); *B65H 2403/732* (2013.01); *B65H 2511/51* (2013.01); *B65H 2511/521* (2013.01); *B65H 2513/10* (2013.01); *B65H 2601/26* (2013.01); *B65H 2601/521* (2013.01); *B65H 2801/09* (2013.01); *B65H 2801/12* (2013.01)

(58) Field of Classification Search
CPC .. B65H 2405/11162; B65H 2405/1117; B65H 2405/1124; B65H 2405/1134
See application file for complete search history.

(56) References Cited

U.S. PATENT DOCUMENTS

| | | | |
|---|---|---|---|
| 8,500,117 | B2 | 8/2013 | Uchida |
| 8,550,452 | B2 | 10/2013 | Nishioka |
| 9,533,844 | B2 * | 1/2017 | Doyo ...................... B65H 1/18 |

FOREIGN PATENT DOCUMENTS

| | | |
|---|---|---|
| JP | 06-92480 A | 4/1994 |
| JP | 2003-075932 A | 3/2003 |
| JP | 2003-271025 A | 9/2003 |
| JP | 3917444 B2 | 5/2007 |
| JP | 2007191228 A | 8/2007 |
| JP | 2008-050139 A | 3/2008 |
| JP | 2009-200720 A | 9/2009 |
| JP | 2014-092631 A | 5/2014 |

* cited by examiner

RECORDING MATERIAL FEEDING DEVICE WITH CONTROL OF MOTOR SPEED

FIELD OF THE INVENTION AND RELATED ART

The present invention relates to a recording material feeding device for feeding a recording material, and an image forming apparatus such as a copying machine or a laser beam printer.

In a recording material feeding device or an image forming apparatus in which a constitution in which an intermediate plate on which recording paper is stacked is raised and then the recording paper is fed is employed, there is liability that an apparatus main assembly is damaged or broken by movement of the intermediate plate due to vibration, impact or the like during transportation. For that reason, in order to prevent damage or breakage of the apparatus main assembly, the intermediate plate is packed using a cushion member such as expanded polystyrene (styrene foam), or a holding member for holding (a position of) the intermediate plate is mounted to the intermediate plate, and then the recording material feeding device or the image forming apparatus is shipped. In such a constitution that the holding member is mounted to the intermediate plate, in the case where the holding member is not removed, the intermediate plate cannot be raised and lowered by the presence of the holding member, so that there is a liability that a large load generates in a driving source for raising the intermediate plate. For that reason, in order to prevent breakage of the intermediate plate or the like, a constitution for preventing an overload by a torque limiter has been disclosed (for example, Japanese Laid-Open Patent Application (JP-A) Hei 06-092480). Further, for example, a constitution in which in the case where the presence of the holding member is detected using a detecting means for detecting removal of the holding member, raising and lowering of the intermediate plate are not effected has been disclosed (for example, JP-A 2003-271025).

However, in the constitution including the torque limiter, when a power source of the recording material feeding device or the image forming apparatus is turned on in a state in which the holding member the holding member for transportation is mounted, the driving source rotates at a normal number of rotations in order to raise the intermediate plate, so that the intermediate plate starts raising thereof. At the time, an overload by the holding member generates in the intermediate plate, but the torque limiter functions and thereby breakage of the intermediate plate is avoided. However, when the torque limiter functions, an intermittent collision noise generates. Further, in general, the normal number of rotations of the driving source for raising the intermediate plate is set at a large value so that a raising and lowering operation ends in a short time. By the large number of rotations, a volume of the collision noise when the torque limiter operates becomes large, so that there is a liability that a user erroneously recognizes that abnormality of the device (apparatus) generated.

Further, in the constitution including the detecting means, when the power source of the image forming apparatus is turned on, in the case where the mounting of the holding member for transportation is detected, a raising operation of the intermediate plate is not performed, so that the intermittent collision noise can be suppressed. However, the detecting means for the holding member is incorporated in the apparatus, so that there is a liability that a size and a cost of the apparatus increase.

SUMMARY OF THE INVENTION

The present invention has been accomplished in the above-described circumstances, and a principal object of the present invention is to provide a recording material feeding device capable of suppressing a collision noise generating in the case where in a downsized and inexpensive constitution, a power source is turned on without removing a holding member for transportation.

According to an aspect of the present invention, there is provided a recording material feeding device having a plate on which a recording material is stacked, a moving member configured to move a position of the plate, a motor that rotates configured to drive the moving member, a holding member configured to hold the position of the plate, the holding member being different from the moving member, a torque limiter configured to limit transmission of a driving torque from the motor to the moving member so as to permit the transmission until a torque exerted on the motor reaches a predetermined torque and so as to stop the transmission of the driving torque when the torque exceeds the predetermined torque, in a case that the motor rotates in a state in which the holding member holds the position of the plate, a storing portion configured to store information on a holding state of the holding member, and a controller configured to control the motor to rotate at a rotational speed slower when the information stored in the storing portion is information indicating that the holding member holds the position of the plate than when the information stored in the storing portion is information indicating that the holding member does not hold the position of the plate.

According to another aspect of the present invention, there is provided a recording material feeding device having a plate on which a recording material is stacked, a moving member configured to move a position of the plate, a motor that rotates configured to drive the moving member, a holding member configured to hold the position of the plate, the holding member being different from the moving member, a torque limiter configured to limit transmission of a driving torque from the motor to the moving member so as to permit the transmission until a torque exerted on the motor reaches a predetermined torque and so as to stop the transmission of the driving torque when the torque exceeds the predetermined torque, in a case that the motor rotates in a state in which the holding member holds the position of the plate, and a controller configured to control the motor to rotate at a rotational speed slower when the holding member holds the position of the plate than when the holding member does not hold the position of the plate.

Further features of the present invention will become apparent from the following description of exemplary embodiments with reference to the attached drawings.

BRIEF DESCRIPTION OF THE DRAWINGS

In FIG. 1,(a) is a sectional view of an image forming apparatus, and (b) is a sectional view of a stacking device in Embodiment 1.

In FIG. 2,(a) and (b) are plan views each showing a relationship between the stacking device and a holding portion in Embodiment 1.

In FIG. 4,(a) is a block diagram of a control system in Embodiment 1,(b) is a timing chart showing an operation of an intermediate plate motor and a holding member when the intermediate plate motor is rotated at the number of rotations during normal drive in Embodiment 1, and (c) is a timing chart showing an operation of an intermediate plate motor and a holding member when the intermediate plate motor is rotated at the number of rotations during intermediate plate holding in Embodiment 1.

DESCRIPTION OF THE EMBODIMENTS

Embodiments for carrying out the present invention will be specifically described with reference to the drawings.

Embodiment 1

In Embodiment 1, as an image forming apparatus, a laser (beam) printer capable of forming a multi-color image is used as an example, and a discrimination of removal of a holding member in the case where a power source of the image forming apparatus is turned on will be described.
[Image Forming Apparatus]

Figure 1:
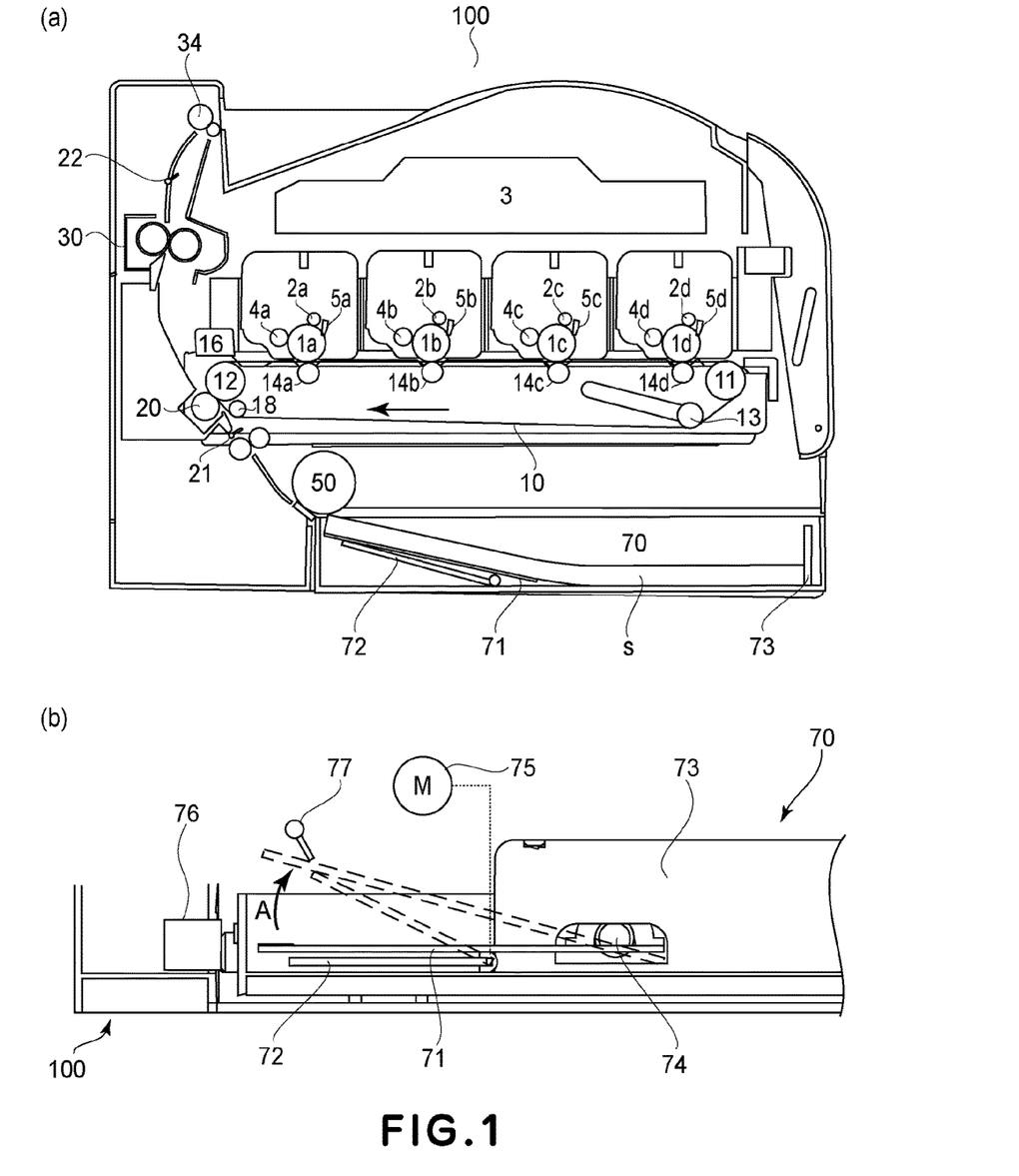

In FIG. 1,(a) is a sectional view showing a structure of the image forming apparatus in this embodiment. The image forming apparatus 100 includes drum-shaped electrophotographic photosensitive members (hereinafter referred to as photosensitive drums) 1a, 1b, 1c, 1d. Here, suffixes a, b, c, d of reference numerals correspond to colors, and for example, a shows yellow, b shows magenta, c shows cyan, and d shows black. In the following, the suffixes a, b, c, d will be omitted except that a specific color is described. The photosensitive drum 1 is rotationally driven at a predetermined peripheral speed (process speed) in the counterclockwise direction shown in (a) of FIG. 1. In a process in which the photosensitive drum 1 is rotated, the photosensitive drum 1 is electrically charged to a predetermined polarity and a predetermined potential by a charging roller 2. Then, the photosensitive drum 1 is scanned with laser light by a laser scanner 3, so that an electrostatic latent image corresponding to an associated color component is formed on the photosensitive drum 1. The electrostatic latent image formed on the photosensitive drum 1 is developed by a developing device 4 for an associated color and thus is visualized as a toner image.

An intermediary transfer belt 10 is stretched by a stretching member and is rotationally driven at the same peripheral speed as the peripheral speed of the photosensitive drum 1 in the clockwise direction (arrow direction in (a) of FIG. 1). Here, a driving roller 11, an opposite roller 12, a tension roller 13 and an auxiliary roller 18 constitute the stretching member. The toner images formed on the photosensitive drums 1 are successively transferred superposedly onto the intermediary transfer belt 10 by a primary transfer voltage applied to primary transfer rollers 14a, 14b, 14c, 14d in a process in which the toner images pass through control portions of the intermediary transfer belt 10 with the photosensitive drums 1. The toners remaining on the photosensitive drums 1 without being transferred onto the intermediary transfer belt 10 are removed by cleaning devices 5. In this way, the toner images of a plurality of colors are superposed on the intermediary transfer belt 10, so that a full-color image corresponding to an objective color image can be obtained.

At a lower portion of the image forming apparatus 100, a stacking device 70 which is a stacking portion in which recording papers (recording materials) S are accommodated is detachably mounted. The recording papers S stacked in the stacking device 70 are separated and fed one by one by a feeding roller 50, and the separated recording paper S is fed to a secondary transfer portion through a registration sensor 21. The secondary transfer portion is a nip formed by the intermediary transfer belt 10 and a secondary transfer roller 20. The full-color image formed on the intermediary transfer belt 10 is transferred onto the recording paper S by a secondary transfer voltage applied to the secondary transfer roller 20 in a process in which the full-color image passes through the secondary transfer portion.

The recording paper S on which the (unfixed) full-color image is transferred is fed into a fixing device 30, in which the recording paper S is heated and pressed, so that the (unfixed) toner image is fixed on the recording paper S. The recording paper S after the fixing is discharged to an outside of the image forming apparatus 100 by a discharging roller 34. The toner remaining on the intermediary transfer belt 10 without being transferred onto the recording paper S is removed by a cleaning device 16. An intermediate plate 71 which is a movable portion, a raising and lowering member 72 and a regulating member 73 will be described later.
[Recording Paper Stacking Device]

Figure 2:
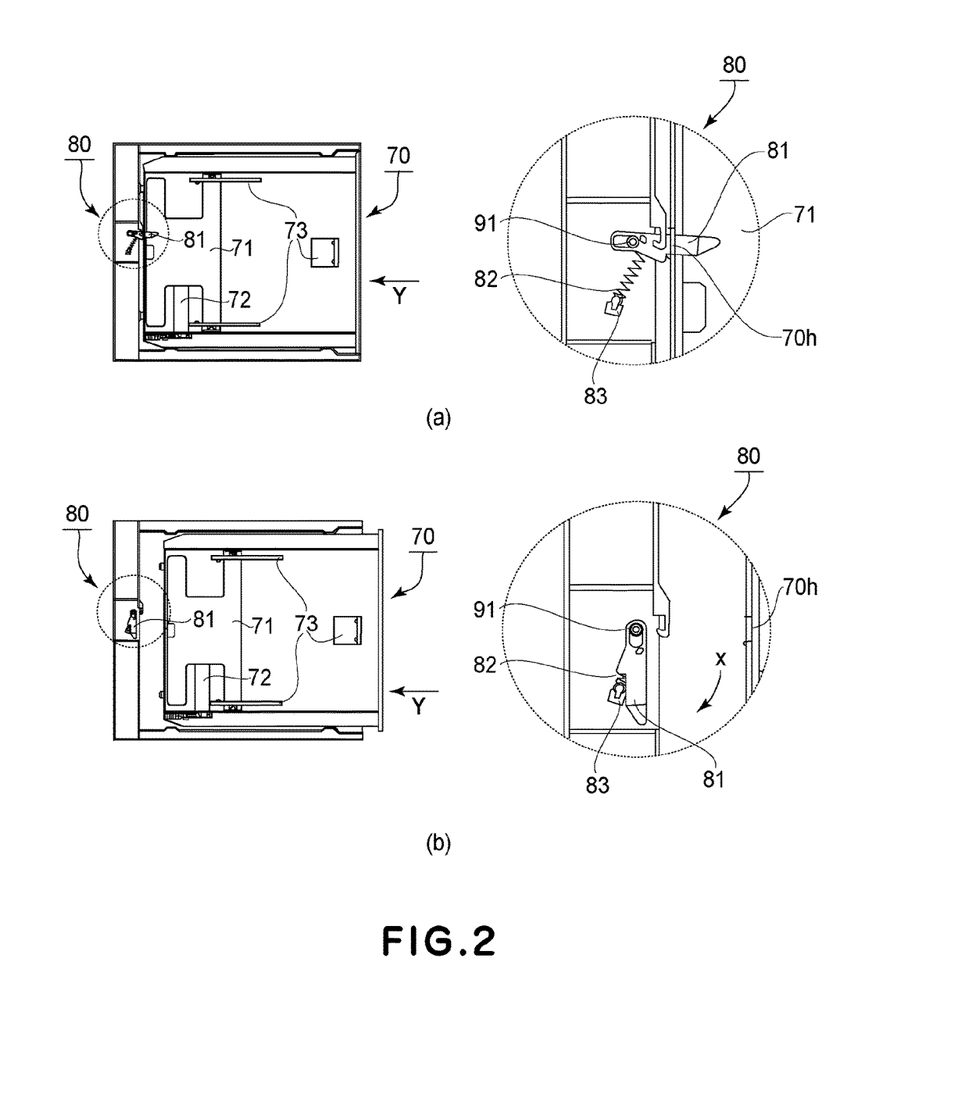

An operation until the recording papers S are stacked in the stacking device 70 by a user and the stacking device 70 is mounted in the image forming apparatus 100 and then the recording paper S is moved to a feedable position will be described. In FIG. 1,(b) is a schematic view showing a detailed structure of the stacking device 70 shown in (a) of FIG. 1. The stacking device 70 is provided with the intermediate plate 71 for stacking the recording papers S, the raising and lowering member 72 for raising the intermediate plate 71 and the regulating member 73 for regulating an end surface of the stacked recording papers S. The regulating member 73 is consisting of a member, shown in (a) of FIG. 1, for regulating a trailing end of the recording papers S with respect to a feeding direction and a member, shown in (b) of FIG. 1, for regulating both end portions of the recording paper S with respect to a direction perpendicular to the feeding direction of the recording paper S, and is constituted as a whole as shown in FIG. 2. The intermediate plate 71 is rotatably supported by an intermediate plate supporting point 74 as a fulcrum provided in the stacking device 70, and is rotatable in a predetermined range. Between an intermediate plate motor 75 which is a driving means and the raising and lowering member 72 which are described later, a torque limiter 500, shown in FIG. 3, for eliminating an overload generating in the intermediate plate motor 75 is provided. The torque limiter 500 which is a limiting means is constituted so as not to transmit a driving force of the intermediate plate motor 75 to the intermediate plate 71 when the overload generates in the intermediate plate motor 75.

Figure 3:
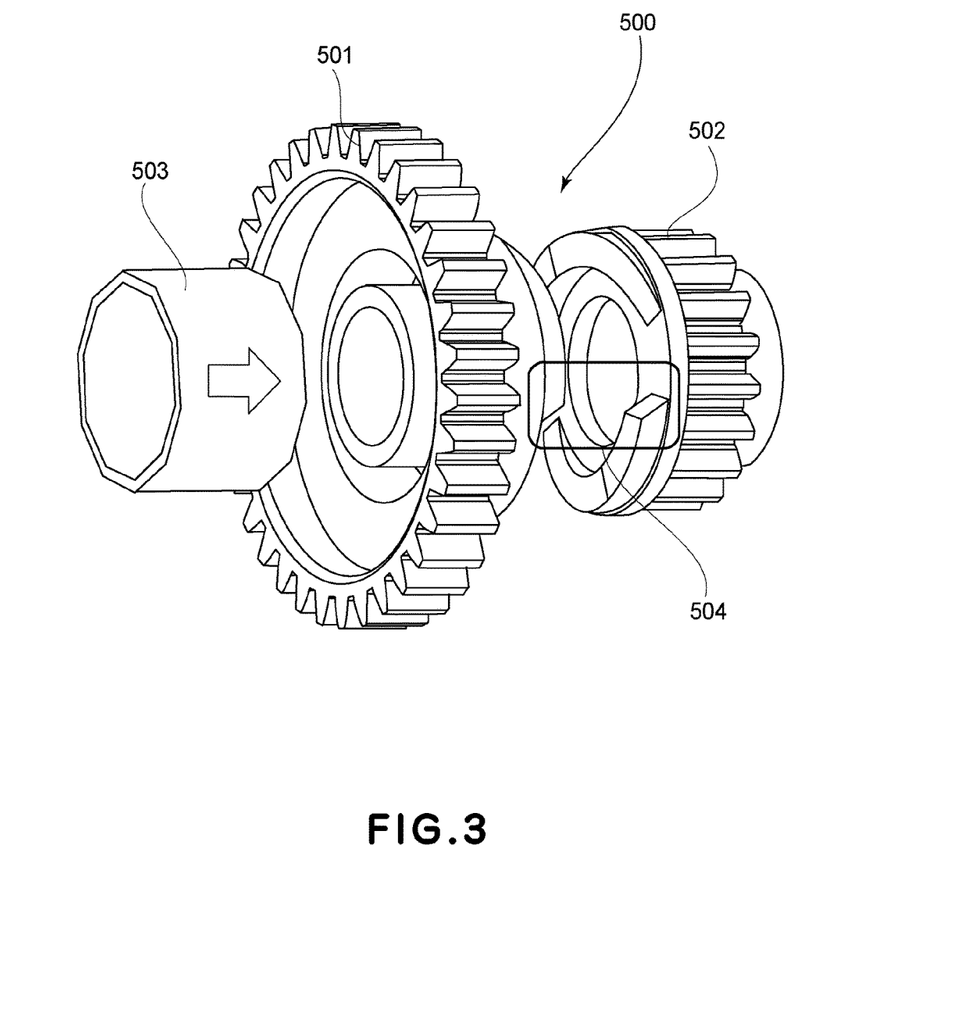
FIG. 3 is a schematic view showing a structure of a torque limiter in Embodiment 1.

The torque limiter 500 shown in FIG. 3 will be described in detail. In this embodiment, the torque limiter 500 of a ratchet type is employed. The torque limiter 500 includes a first gear 501, a second gear 502 and a ratchet spring 503. The first gear 501 is rotated by a driving force of the intermediate plate motor 75. The second gear 502 engages with the first gear 501 at an engaging portion 504 and connects with the raising and lowering member 72. The ratchet spring 503 urges the first gear 501 in an arrow direction shown in FIG. 3 so that the first gear 501 engages with the second gear 502. Here, the first gear 501 and the second gear 502 engage with each other at inclined surfaces at the engaging portion 504 as shown in FIG. 3. Therefore, in a state in which the first gear 501 and the second gear 502 engage with each other, in the case where the first gear 501 is rotated to rotate the second gear 502, a thrust force for eliminating the engagement generates between the two gears.

The torque limiter 500 transmits a driving torque by the intermediate plate motor 75 to the intermediate plate 75 in the case where an urging force by the ratchet spring 503 is larger than the thrust force, i.e., in the case where a load torque exerted on the intermediate plate motor 75 is smaller than a predetermined torque. This is because the first gear 501 and the second gear 502 engage with each other and thus the second gear 502 is rotated with rotation of the first gear 501.

On the other hand, the torque limiter 500 stops the transmission of the driving torque by the intermediate plate motor 75 to the intermediate plate 75 in the case where an urging force by the ratchet spring 503 is smaller than the thrust force, i.e., in the case where a load torque exerted on the intermediate plate motor 75 is larger than a predetermined torque. This is because the engagement between the first gear 501 and the second gear 502 is eliminated and thus the second gear 502 is not rotated with rotation of the first gear 501.

Further, in the case where the load torque exerted on the intermediate plate motor 75 is larger than the predetermined torque and thus the engagement between the first gear 501 and the second gear 502 is eliminated, the first gear 501 rotates through one-full turn, so that the inclined surface of the first gear 501 and the inclined surface of the second gear 502 engage with each other again. At this time a collision noise generates. The collision noise becomes large in proportion to a rotational speed of the intermediate plate motor 75. The above is description about the torque limiter 500 shown in FIG. 3.

The image forming apparatus 100 includes the intermediate plate motor 75, a detecting portion 76 which is a first detecting means for detecting whether or not the stacking device 70 is mounted, and a detecting portion 77 which is a second detecting means for detecting whether or not the intermediate plate 71 is in a feeding position. Here, the feeding position (predetermined position) refers to a position where the intermediate plate 71 is raised and the recording paper S stacked on the intermediate plate 71 is feedable by the feeding roller 50. The intermediate plate motor 75 generates a driving force in the raising and lowering member 72. The detecting portion 76 detects that the stacking device 70 was mounted in the image forming apparatus 100. The detecting portion 77 detects that the intermediate plate 71 was raised to a position where the recording paper S is feedable.

When mounting of the stacking device 70 is detected by the detecting portion 76, the intermediate plate motor 75 is driven, so that the raising and lowering member 72 and the intermediate plate 71 are raised in an arrow A direction in (b) of FIG. 1. In the case where the intermediate plate 71 or the stacked recording paper S is detected by the detecting portion 77, drive of the intermediate plate motor 75 is stopped. In (b) of FIG. 1, broken lines show positions of the intermediate plate 71 and the raising and lowering member 72 in a state in which the raising and lowering member 72 and the intermediate plate 71 reach the feeding position and the drive of the intermediate plate motor 75 is stopped.

[Holding Method and Eliminating Method of Stacking Device]

The image forming apparatus 100 is transported in a state in which a position of the intermediate plate 71 is held by a holding member in order to prevent breakage by vibration during transportation. Further, a holding state of the intermediate plate 71 is eliminated before use by the user. In FIG. 2,(a) and (b) are top (plan) views of the stacking device 70 and are enlarged views for illustrating an operation of a holding portion 80, encircled by a broken line, for holding a position of the intermediate plate 71. In FIG. 2,(a) shows a state of the holding portion 80 during transportation. During transportation shown in (a) of FIG. 2, the stacking device 70 and the holding member 81 engage with each other. A side wall of the stacking device 70 on a side where the detecting portion 76 is provided is provided with a hole 70h for permitting passing of the holding member 81. As shown in the enlarged view of the holding portion 80 shown on a right side of (a) of FIG. 2, the holding member 81 projects so that the holding member 81 passes through the hole 70h and presses the intermediate plate 71, and thus the intermediate plate 71 is in a state in which the intermediate plate 71 is held so as not to rotate about the intermediate plate supporting point 74 as the fulcrum. The holding member 81 holds the intermediate plate 71 at a position below the feeding position with respect to a vertical direction.

When the transportation of the image forming apparatus 100 is ended and the image forming apparatus 100 is provided at a predetermined place, the intermediate plate 71 is released (eliminated) from the holding state before use of the image forming apparatus 100. The elimination of the holding state of the intermediate plate 71 can be performed by pulling the stacking device 70 from the image forming apparatus 100 in a direction (−Y direction) opposite to an arrow Y direction in (a) of FIG. 2. In FIG. 2,(b) is the schematic view showing the holding portion 80 in a state in which the stacking device 70 is pulled and the holding of the intermediate plate 71 is eliminated. When the user pulls the stacking device 70 in the −Y direction in (a) of FIG. 2, engagement of the holding member 81 with the stacking device 70 is eliminated. When the engagement of the holding member 81 with the stacking device 70 is eliminated, the holding member 81 on which an urging force is exerted by an urging member 82 is, as shown in the enlarged view of the holding portion 80 shown on the right side of (b) of FIG. 2, supported by a rotation shaft 91 and is rotated in an arrow X direction in the enlarged view in 8b) of FIG. 2. The rotation of the rotating holding member 81 stops at a position controlling a stopper 83. This position is a retracted position of the holding member 81. In this way, the holding member 81 disengaged from the stacking device 70 is retained at the retracted position. As a result, the intermediate plate 71 is released from the holding state by the holding member 81, so that the intermediate plate is capable of raising the recording paper S. As described above, the holding member 81 in this embodiment is removed with removal of the stacking device 70 from the image forming apparatus 100.

[System Constitution]

Figure 4:
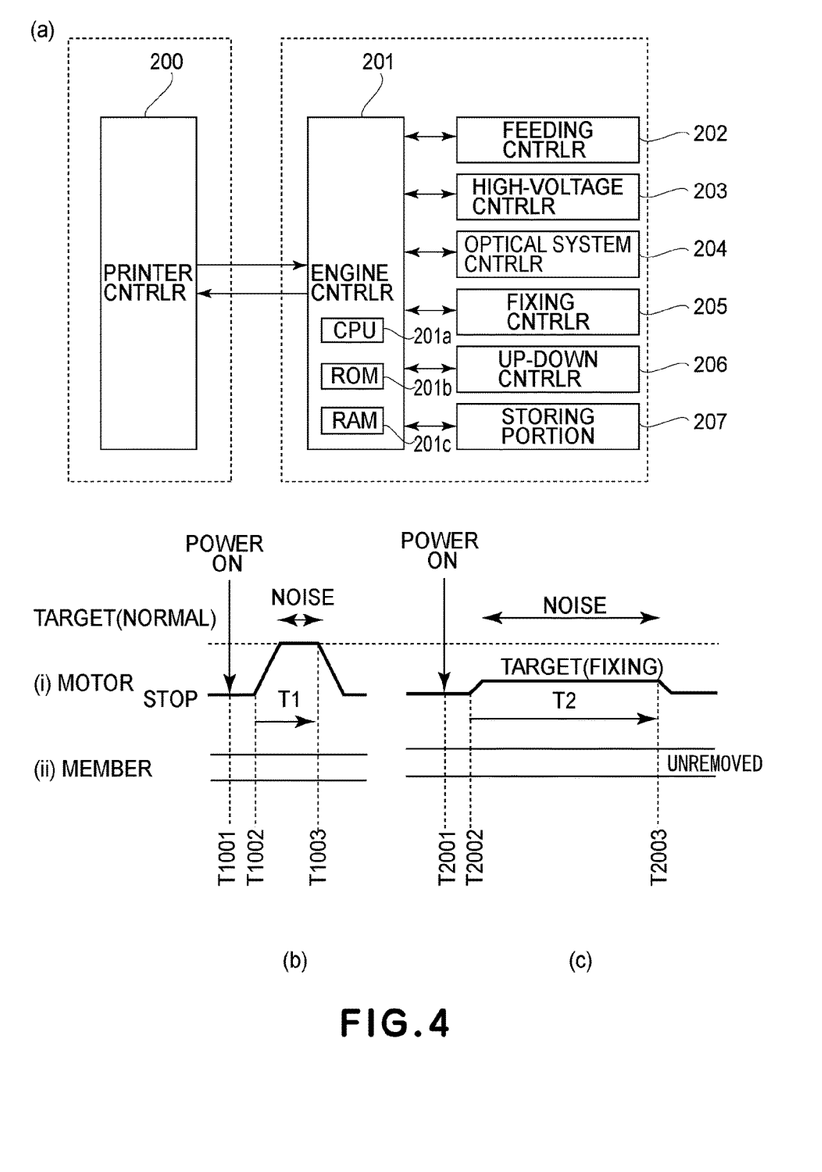

A system constitution for controlling the image forming apparatus 100 will be described. In FIG. 4,(a) is a block diagram showing a constitution of a control system for controlling respective portions shown in (a) of FIG. 1. A printer controller 200 develops image data, sent from an external device such as a host computer, into bit data necessary to effect image formation by the printer (image forming apparatus 100). Further, the printer controller 200 reads inside information of an engine controller 201 by serial communication with the engine controller 201 as a control means and then displays the inside information on a display portion 307 described later. The engine controller 201 includes CPU 201a, ROM 201b and RAM 201c. The CPU 201a executes various programs stored in the ROM 201b while using the RAM 201c as an operation region, whereby the CPU 201a controls the respective portions of the image forming apparatus 100.

The engine controller 201 sends and receives information by serial communication with the printer controller 200, and effects control of the respective portions described below on the basis of the information sent to and received from the printer controller 200. A paper feeding controller 202 controls an unshown pick-up solenoid, an unshown paper feeding motor and the feeding roller 50 on the basis of an instruction from the engine controller 201, so that the recording paper S is fed toward the registration sensor 21. A high-voltage controller 203 effects output and stop of high voltages necessary to perform respective processes of charging, development, primary transfer and secondary transfer on the basis of an instruction from the engine controller 201. An optical system controller 204 effects drive and stop of unshown scanner motor provided in the laser scanner 3 and flickering control of laser light with which the respective photosensitive drums 1 are scanned, on the basis of an instruction from the engine controller 201. A fixing controller 205 effects temperature control by heat generation and stop of an unshown heater of the fixing device 30 and drive and stop of a fixing (device) motor, on the basis of an instruction from the engine controller 201. A raising and lowering controller 206 effects drive and stop of the intermediate plate motor 75 on the basis of an instruction from the engine controller 201. A storing portion 207 which is a storing means stores information on removal of the holding member 81 on the basis of an instruction from the engine controller 201.

[Raising and Lowering Operation of Intermediate Plate in Holding State]

The image forming apparatus 100 is, as shown in (c) of FIG. 2, assembled so that the image forming apparatus 100 is in a state in which the holding member 81 presses the intermediate plate, and is transported in this state. Here, in the case where a power source of the image forming apparatus 100 in the state in which the intermediate plate 71 is held is tuned on without performing pulling and insertion of the stacking device 70 by the user, the engine controller 201 provides an instruction, to the raising and lowering controller 206, to effect control for raising the intermediate plate 71 at the number of rotations during normal drive. At this time, an overload generates due to the holding of the intermediate plate 71 by the holding member 81 and a torque limiter of the intermediate plate supporting point 74 functions, so that an intermittent collision noise generates. In FIG. 4,(b) is a timing chart showing a state thereof. In (b) of FIG. 4, (i) shows the number of rotations of the intermediate plate 71 and a target number of rotations during normal drive is indicated by a broken line. In (b) of FIG. 4, (ii) shows a state of the holding member 81, and a state in which a holding state of the holding member 81 pressing the intermediate plate 71 is not eliminated is represented by "UNREMOVED". In (i) and (ii) of (b) of FIG. 4, an abscissa represents a time.

At timing T1001, when the power source of the image forming apparatus 100 is turned on ("POWER ON"), the engine controller 201 provides an instruction to the raising and lowering controller 206 so that the intermediate plate motor 75 is driven at the target number of rotations during the normal drive. As a result, at timing T1002, the raising and lowering controller 206 starts the drive of the intermediate plate motor 75. The target number of rotations of the intermediate plate motor 75 during the normal drive is set in consideration of completion of a raising operation of the intermediate plate 71 in a short time to the possible extent. In (b) of FIG. 4, a time T1 is a time determined in consideration of a movement distance or the like of the intermediate plate 71 in a period from start of the drive of the intermediate plate motor 75 at the target number of rotations during the normal drive until the detecting portion 77 detects the intermediate plate 71. In the case where the holding member 81 is removed (retracted), the intermediate plate 71 reaches a feeding position until the time T1 elapses at the latest.

At timing T1003 which elapses from the timing T1002 by the time T1, the engine controller 201 stops the drive of the intermediate plate motor 75 by the raising and lowering controller 206. In this case, the torque limiter functions, and therefore even when the time T1 elapses, the intermediate plate 71 does not raise, so that the detecting portion 77 does not detect the intermediate plate 71. The intermittent collision noise generating by the functioning of the torque limiter at least generates in a period in which the number of rotations of the intermediate plate motor 75 is the target number of rotations during the normal drive, as shown by a double-pointed arrow in (b) of FIG. 4, so that a volume of the collision noise becomes large.

Therefore, in this embodiment, whether or not the holding member 81 is removed and in the case where the holding member 81 is discriminated as being not removed, when the intermediate plate 71 is raised (lifted up), control is effected so that the intermediate plate motor 75 is driven at the number of rotations lower than the target number of rotations during the normal drive. As a result, although the intermittent collision noise generates, the intermediate plate motor 75 is driven at the number of rotations lower than the target number of rotations during the normal drive, and therefore the volume of the generated collision noise is smaller than a volume of the collision noise generating when the intermediate plate motor 75 is driven at the number of rotations during the normal drive. Thus, in this embodiment, a driving speed of the intermediate plate motor 75 when the holding member 81 is not removed is made slower than a driving speed of the intermediate plate motor 75 when the holding member 81 is removed, so that the collision noise is reduced.

In FIG. 4,(c) is a timing chart showing a state when the intermediate plate motor 75 is driven at the number of rotations lower than the target number of rotations during the normal drive. In (c) of FIG. 4, (i) and (ii) are graphs similar to those in (b) of FIG. 4.

At timing T2001, when the power source of the image forming apparatus 100 is turned on the engine controller 201 provides an instruction to the raising and lowering controller 206 so that the intermediate plate motor 75 is driven at a target number of rotations when the intermediate plate 81 is held (hereinafter referred to as during intermediate plate holding). As a result, at timing T2002, the raising and lowering controller 206 starts the drive of the intermediate plate motor 75. The target number of rotations of the intermediate plate motor 75 during the intermediate plate holding is lower than the target number of rotations during the normal drive (the horizontal) broken line of (i) in each of (b) and (c) of FIG. 4. The target number of rotations of the intermediate plate motor 75 during the intermediate plate holding may also be the lowest number of rotations among numbers of rotations at which a stable rotation operation of the intermediate plate motor 75 can be maintained. In (c) of FIG. 4, a time T2 which is a predetermined time is a time determined in consideration of a movement distance or the like of the intermediate plate 71 in a period from start of the drive of the intermediate plate motor 75 at the target number of rotations during the intermediate plate holding until the detecting portion 77 detects the intermediate plate 71. In the case where the holding member 81 is removed (retracted), the intermediate plate 71 reaches a feeding position until the time T2 elapses at the latest.

At timing T2003 which elapses from the timing T2002 by the time T2, the engine controller 201 stops the drive of the intermediate plate motor 75 by the raising and lowering controller 206. In this case, the torque limiter functions, and therefore even when the time T2 elapses, the intermediate plate 71 does not raise, so that the detecting portion 77 does not detect the intermediate plate 71. The intermittent collision noise generating by the functioning of the torque limiter at least generates in a period in which the number of rotations of the intermediate plate motor 75 is the target number of rotations during the intermediate plate holding, as shown by a double-pointed arrow in (c) of FIG. 4, so that a volume of the collision noise is small compared with that in the case where the intermediate plate motor 75 is driven at the target number of rotations during the normal drive. As a result, it can be expected that the user heard the collision noise erroneously recognizes that the apparatus breaks down. Further, by stopping the drive of the intermediate plate motor 75 when the time T2 elapses, the collision noise stops.

[Constitution of Engine Controller Including Discriminating Portion]

Figure 5:
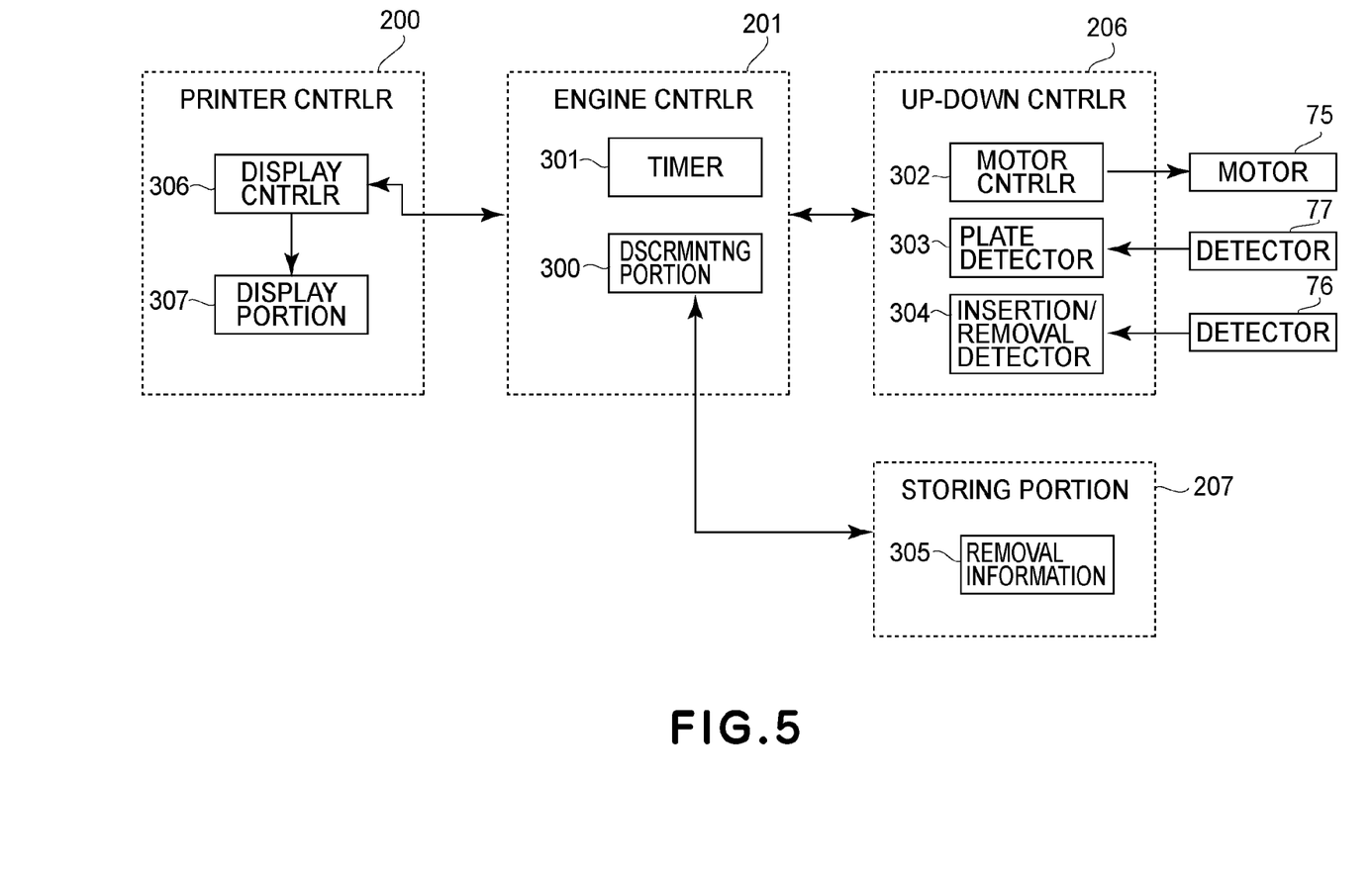
FIG. 5 is a block diagram of an engine controller in Embodiment 1.

A constitution of the engine controller 201 provided with a discriminating portion for discriminating the removal of the holding member 81 will be described. FIG. 5 is a block diagram showing controllers relating to the engine controller 201 and their structures. The engine controller 201 includes a discriminating portion 300 and a timer 301. The raising and lowering controller 206 includes an intermediate plate motor controller 302, an intermediate plate detecting portion 303 and an insertion/removal detecting portion 304. The storing portion 207 includes removal information 305.

The discriminating portion 300 discriminates whether or not the holding member 81 is removed, on the basis of detection results of the insertion/removal detecting portion 304 and the intermediate plate detecting portion 303, and stores information on whether or not the holding member 81 is removed (hereinafter referred to as the removal information) in the storing portion 207. The timer 301 effects start and stop of measurement of a time on the basis of an instruction from the engine controller 201, and measures a driving time of the intermediate plate 75 by the intermediate plate motor controller 302. The intermediate plate motor controller 302 effects start and stop of the drive of the intermediate plate motor 75. The intermediate plate detecting portion 303 retains a signal, as information notified from a detecting portion 77 for detecting the feeding position. The insertion/removal detecting portion 304 retains a signal, as information, notified from a detecting portion 76 of the stacking device 70. The removal information 305, for the holding member 81, of the storing portion 207 includes information instructed from the discriminating portion 300. The storing portion 207 in this embodiment is a volatile storing means, so that the removal information 305 of the storing portion 207 has such a property that the contents thereof are erased by turning off and on the power source. A display content controller 306 of the printer controller 200 controls a display portion 307 on the basis of information notified from the engine controller 201.

Depending on discrimination, by the discriminating portion 300, as to whether the holding member 81 is removed or unremoved, the engine controller 201 provides an instruction, to the raising and lowering controller 206, as to the number of rotations during normal use and start of drive of the intermediate plate motor 75 at the number of rotations during the intermediate plate holding. The engine controller 201 not only provides the instruction to the raising and lowering controller 206 but also notifies an operation result to the printer controller 200 and stores the operation results in the storing portion 207.

[Discriminating Process of Engine Controller]

Figure 6:
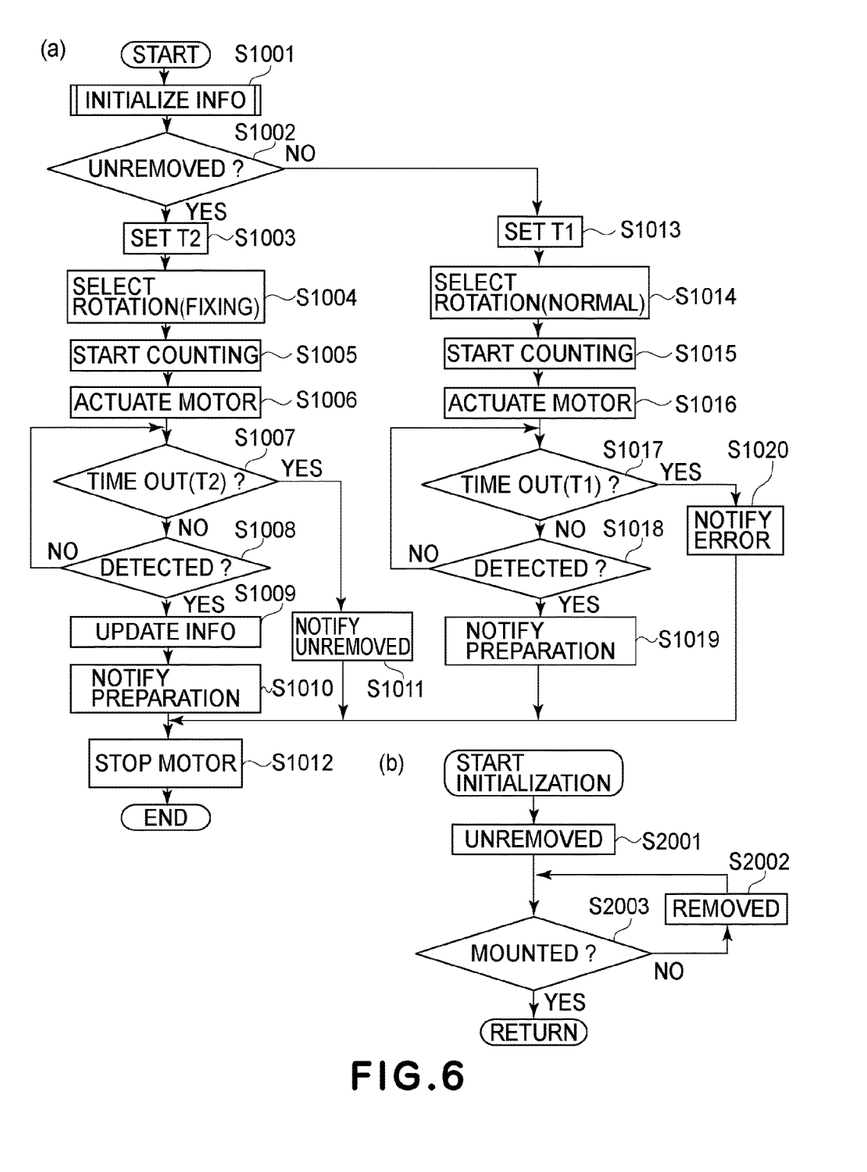
FIG. 6 is a flowchart of the engine controller in Embodiment 1.

The discrimination in the engine controller 201 as to whether the holding member 81 is removed or unremoved will be described. In discrimination as to whether or not the holding member 81 is removed (hereinafter referred to as removal discrimination), the case where discrimination that the holding member 81 is removed is made is the following case. That is, the case includes the case where after the power source of the image forming apparatus 100 is turned on, the state of the stacking device 70 is changed from a mounted state to a non-mounted state or the case where the detecting portion 303 detects, by the detecting portion 77, that the intermediate plate 71 reached the feeding position. In another case, discrimination that the holding member 81 is not removed, i.e., in an unremoved state is made. In FIG. 6,(a) and (b) are flowcharts each showing the removal discrimination of the holding member 81. In FIG. 6,(a) shows a process carried out by the engine controller 201, and (b) shows a process carried out by the discriminating portion 300.

The flowchart of (a) of FIG. 6 will be described while taking the case where the power source of the image forming apparatus 100 is turned on in the unremoved state of the holding member 81, as an example. In (a) of FIG. 6, in S1001 (step 1001), the engine controller 201 provides an instruction of initialization of information on the holding member 81 (hereinafter simply referred to as holding member information) to the discriminating portion 300, so that the discriminating portion 300 starts the process shown in (b) of FIG. 6. In (b) of FIG. 6, in S2001, whether or not the holding member 81 is removed is unclear at timing when the power source of the image forming apparatus 100 is turned on, and therefore the discriminating portion 300 discriminates that the holding member 81 is unremoved, and then stores information of "UNREMOVED" as the removal information 305 in the storing portion 207. In S2003, the discriminating portion 300 discriminates whether or not the stacking device 70 is mounted, on the basis of a detection result of the detecting portion 76. In this manner, in this embodiment, when the power source of the image forming apparatus 100 is turned on, first, the holding member 81 is regarded as "UNREMOVED", and thereafter, discrimination as to mounting and demounting of the stacking device 70 is made.

In S2003, in the case where the discriminating portion 300 discriminated that the stacking device 70 was mounted, the process is returned to the process of (a) of FIG. 6. In S2003, in the case where the discriminating portion 300 discriminated that the stacking device 70 was not mounted, the process goes to a process of S2002. In S2002, the discriminating portion 300 discriminates that the holding member 81 has already been removed (hereinafter, referred to as REMOVED), and stores information of "REMOVED" as the removal information 305 in the storing portion 207, and then the process is returned to the process of S2003, so that the image forming apparatus 100 is in stand-by until the stacking device 70 is mounted. By this process, the discriminating portion 300 discriminates that the holding member 81 is unremoved ("UNREMOVED") when the stacking device 70 is in a mounted state, and discriminates that the holding member 81 is removal ("REMOVED") when the stacking device 70 is in an unmounted state.

After the holding member initialization process by the discriminating portion 300 in (b) of FIG. 6 is ended, in S1002, the engine controller 201 discriminates whether or not the holding member 81 is unremoved on the basis of a result of the discrimination of the holding member 81 by the discriminating portion 300 and information stored as the removal information 305. In the case where in S1002, the engine controller 201 discriminated that the holding member 81 was not unremoved, i.e., was removed, the engine controller 201 sets the time T1 in the timer 301 in S1013 and then selects the number of rotations during normal drive as a target number of rotations of the intermediate plate motor 75 in S1014. In S1015, the engine controller 201 starts measurement by the timer 301, and in S1016, the engine controller 201 starts drive of the intermediate plate motor 75. In S1017, the engine controller 201 discriminates whether or not the time T1 elapsed (time-out) by making reference to the timer 301.

In S1017, in the case where the engine controller 201 discriminates that the time T1 is not time-out, in S1018, the engine controller 201 discriminated whether or not the intermediate plate detecting portion 303 detected the intermediate plate 71. In S1018, in the case where the engine controller 201 discriminated that the intermediate plate 71 was not detected, the process is returned to the process of S1017. In S1018, in the case where the engine controller 201 discriminated that the intermediate plate 71 was detected, the engine controller 201 notifies the printer controller 200 of completion of feeding preparation in S1019, so that the process goes to the process of S1012. In S1017, in the case where the engine controller 201 discriminated that the time T2 was time-out, the engine controller 201 notifies the printer controller 200 of an error in S1020, so that the process goes to the process of S1012. As described above, in S1002, in the case where the engine controller 201 discriminated that the holding member 81 was removed, a normal operation is performed.

On the other hand, in S1002, in the case where the engine controller 201 discriminated that the holding member 81 was unremoved on the basis of the discrimination of the discriminating portion 300, the process goes to the process of S1003. In S1003, the engine controller 201 sets the time T2 in the timer 301, and then in S1004, the engine controller 201 selects the number of rotations during intermediate plate holding as a target number of rotations of the intermediate plate motor 75. In S1005, the engine controller 201 starts measurement by the timer 301, and then S1006, the engine controller 201 starts drive of the intermediate plate motor 75. In S1007, the engine controller 201 discriminates whether or not the time T2 elapses (time-out) by making reference to the timer 301.

In S1017, in the case where the engine controller 201 discriminates that the time T1 is not time-out, in S1018, the engine controller 201 discriminated whether or not the intermediate plate detecting portion 303 detected the intermediate plate 71. In S1018, in the case where the engine controller 201 discriminated that the intermediate plate 71 was not detected, the process is returned to the process of S1017. In S1018, in the case where the engine controller 201 discriminated that the intermediate plate 71 was detected, the engine controller 201 notifies the printer controller 200 of completion of feeding preparation in S1019, so that the process goes to the process of S1012. In S1017, in the case where the engine controller 201 discriminated that the time T2 was time-out, the engine controller 201 notifies the printer controller 200 of an error in S1020, so that the process goes to the process of S1012. As described above, in S1002, in the case where the engine controller 201 discriminated that the holding member 81 was removed, a normal operation is performed.

On the other hand, in S1002, in the case where the engine controller 201 discriminated that the holding member 81 was unremoved on the basis of the discrimination of the discriminating portion 300, the process goes to the process of S1003. In S1003, the engine controller 201 sets the time T2 in the timer 301, and then in S1004, the engine controller 201 selects the number of rotations during intermediate plate holding as a target number of rotations of the intermediate plate motor 75. In S1005, the engine controller 201 starts measurement by the timer 301, and then S1006, the engine controller 201 starts drive of the intermediate plate motor 75. In S1007, the engine controller 201 discriminates whether or not the time T2 elapses (time-out) by making reference to the timer 301.

In S1007, in the case where the engine controller 201 discriminates that the time T1 is not time-out, in S1008, the engine controller 201 discriminated whether or not the intermediate plate detecting portion 303 detected the intermediate plate 71. In S1008, in the case where the engine controller 201 discriminated that the intermediate plate 71 was not detected, the process is returned to the process of S1007. In S1008, in the case where the engine controller 201 discriminated that the intermediate plate 71 was detected, the process goes to the process of S1009. Here, in an unremoved state of the holding member 81, the intermediate plate detecting portion 303 does not detect that the intermediate plate reached the feeding position, and therefore the timer 301 causes time-out. In S1017, in the case where the engine controller 201 discriminated that the time T2 was time-out, the engine controller 201 notifies the printer controller 200 that the holding member 81 is unremoved in S1011, so that the process goes to the process of S1012. In S1012, the engine controller 201 stops the drive of the intermediate plate motor 75, and ends the process.

In S1008, in the case where the engine controller 201 discriminated that the intermediate plate 71 was detected, in S1009, the engine controller 201 updates the information of the holding member 81. Specifically, the engine controller 201 stores information of "REMOVED" as the removal information 305 in the storing portion 207 by the discriminating portion 300. In this case, although the holding member 81 is discriminated as being unremoved in S1002, the intermediate plate 71 is detected by the intermediate plate detecting portion 303, and therefore the holding member 81 is removed. Such a case generates when in a state in which the power source of the image forming apparatus 100 is turned off, the stacking device 70 is demounted from the image forming apparatus 100 by the user and then the holding member 81 is removed. In S1010, the engine controller 201 notifies the printer controller 200 of completion of feeding preparation, and the process goes to S1012. In the case where the holding member 81 is removed when the power source of the image forming apparatus 100 is turned on, the intermediate plate detecting portion 303 detects that the intermediate plate 71 reached the feeding position before the timer 301 causes time-out (YES of S1008).

According to this embodiment, in the case where the holding member 81 is discriminated as being unremoved after the power source of the image forming apparatus 100 is turned on, the intermediate plate motor 75 is driven at a target number of rotations during intermediate plate holding lower than the number of rotations during normal drive. As a result, in the case where the stacking device 70 and the holding member 81 are engaged with each other, the volume of the intermittent collision noise generating by the functioning of the torque limiter is alleviated, and therefore it is possible to suppress that the user erroneously recognize breakdown of the image forming apparatus 100. Further, by the display content controller 306 which is a notifying means, a message prompting the user to pull and insert the stacking device 70 is displayed at the display portion 307, so that it is possible to prompt the user to remove the holding member 81.

In this embodiment, a constitution in which the intermediate plate 71 is raised and lowered by driving the intermediate plate motor 75 is described, but the constitution of the driving source is not limited thereto. For example, even in such a constitution that a driving force of the feeding motor is transmitted to the raising and lowering member 72 by a clutch or the like, this embodiment is applicable. Further, the image forming apparatus capable of forming a multi-color image is described as an example, but this embodiment is applicable to even an image forming apparatus capable of forming a monochromatic (single-color) image.

As described above, according to this embodiment, by a small-sized and in expensive constitution, it is possible to suppress the collision noise generating in the case where the power source is turned on without removing the holding member for transportation.

Embodiment 2

Embodiment 1 employs the constitution based on the premise that discrimination that the holding member 81 is not removed is made every turning-on of the power source of the image forming apparatus 100 (S2001 in (b) of FIG. 6). In Embodiment 1, the removal information 305 of the storing portion 207 disappears by turning-off and turning-on of the power source, and therefore, in S2001 in (b) of FIG. 6, the information on the holding member 81 is initialized to "UNREMOVED". On the other hand, in Embodiment 2, a storing portion 407 for storing removal information 401 on the holding member 81 is a non-volatile storing means, so that the removal information of the storing portion 407 does not disappear by turning-off and turning-on of the power source. In the case where when the power source of the image forming apparatus 100 is turned on, the removal information 401 of the storing portion 407 is information that the holding member 81 is unremoved, an instruction that a target number of rotations during intermediate plate holding is set at the number of rotations of drive of the intermediate plate motor 75 is provided to the raising and lowering controller 206. Incidentally, a basic constitution of the image forming apparatus 100 is the same as the constitution of Embodiment 1, and therefore the same reference numerals or symbols are used and description thereof will be omitted.

[Structure of Engine Controller Including Discriminating Portion]

Figure 7:
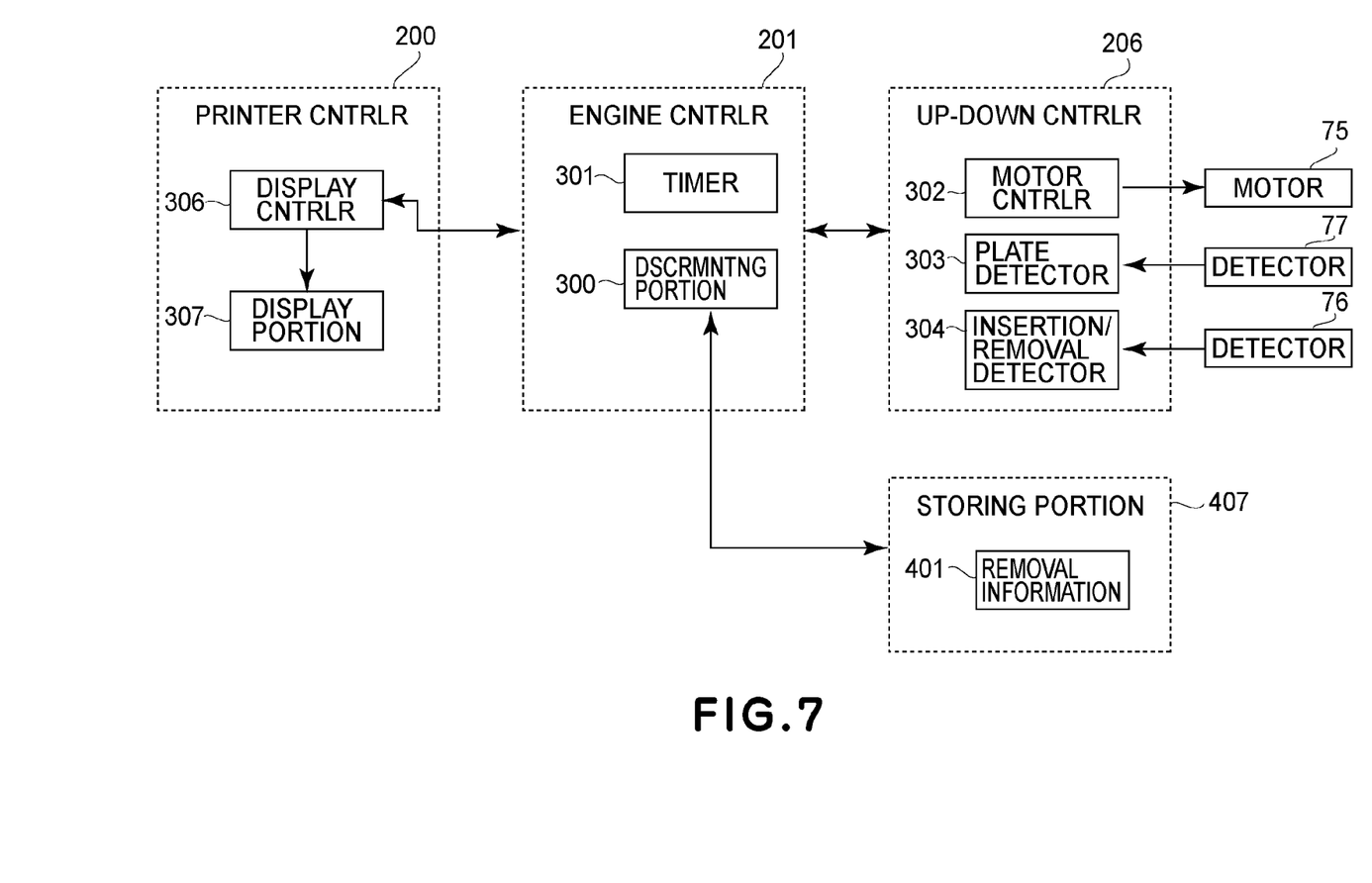
FIG. 7 is a block diagram of an engine controller in Embodiment 2.

FIG. 7 is a block diagram showing controllers relating to the engine controller 201 and structures of the controllers. Incidentally, constituent elements identical to those in Embodiment 1 described with reference to FIG. 5 are represented by the same reference numerals or symbols, and therefore will be omitted from description. A difference from Embodiment 1 is the storing portion 407 which is the non-volatile storing means. The storing portion 407 in this embodiment stores the removal information 401 on removal of the holding member 81. The removal information 401 is information instructed from the discriminating portion 300 and is non-volatile as a property thereof in this embodiment, so that the information is retained even after the power source of the image forming apparatus 100 is turned off. Incidentally, the image forming apparatus 100 is assembled so that the holding member 81 presses the intermediate plate 71 during manufacturing, and at the same time, the removal information 401 is initialized to "UNREMOVED" for the holding member 81.

[Discriminating Process of Engine Controller]

A discriminating process as to whether the holding member 81 is removed or unremoved in this embodiment will be described. Discrimination of the removal of the holding member 81 is made on the basis of information stored as the removal information 401 in the storing portion 407 in addition to the mounting of the stacking device 70 and reaching of the intermediate plate 71 to the feeding position which are described in Embodiment 1. The discriminating process of the removal of the holding member 81 is made by performing the process described with reference to (a) of FIG. 6 similarly as in Embodiment 1. A difference from Embodiment 1 is the initializing operation of the discriminating portion 300 performed in S1001 in (a) of FIG. 6. In this embodiment, not the process of (b) of FIG. 6, a process shown in FIG. 8 is carried out.

Figure 8:
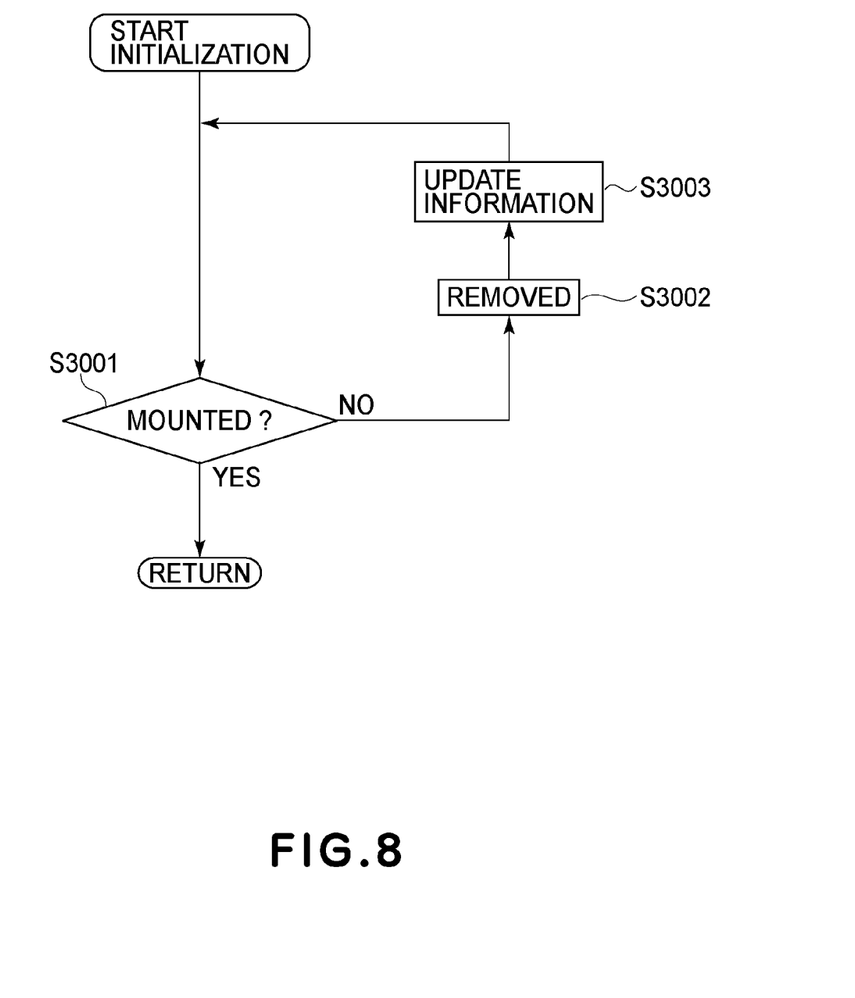
FIG. 8 is a flowchart of the engine controller in Embodiment 2.

FIG. 8 is an operation process of the discriminating portion 300 in this embodiment. In S3001, the discriminating portion 300 discriminates whether or not the stacking device 70 is mounted. In the case where the discriminating portion 300 discriminated that the stacking device 70 was mounted in S3001, the process is returned to the process of (a) of FIG. 6. On the other hand, in the case where the discriminating portion 300 discriminated that the stacking device 70 was not mounted in S3001, the process goes to a process of S3002. In S3002, the discriminating portion 300 discriminates that the holding member 81 is removed, and stores information indicating removal as the removal information 401 in the storing portion 407 and updates the information in S3003, and then the process is returned to the process of S3001.

According to this embodiment, in the case where on the basis of the non-volatile information stored in the storing portion 407, the holding member 81 is discriminated as being unremoved after the power source of the image forming apparatus 100 is turned on, the intermediate plate motor 75 is driven at the target number of rotations during intermediate plate holding. In the case where the stacking device 70 and the holding member 81 are engaged with each other, the volume of the intermittent collision noise generating by the functioning of the torque limiter is alleviated, so that it is possible to suppress that the user erroneously recognize breakdown of the image forming apparatus 100. Further, by the display content controller 306, a message prompting the user to pull and insert the stacking device 70 is displayed at the display portion 307, so that it is possible to prompt the user to remove the holding member 81. On the other hand, after once the removed of the holding member 81 is stored as the removal information 401 in the storing portion 407, even after the power source of the image forming apparatus 100 is turned on, the intermediate plate motor 75 can be driven at the target number of rotations during the normal drive. By such a constitution in this embodiment, only when there is a need to reduce the volume of the intermittent collision noise generating by the functioning of the torque limiter, the intermediate plate motor 75 is driven at the target number of rotations during the intermediate plate holding, so that improvement in usability can be expected.

In this embodiment, a constitution in which the intermediate plate 71 is raised by driving the intermediate plate motor 75 is described, but the constitution of the driving source is not limited thereto. For example, even in such a constitution that a driving force of the feeding motor is transmitted to the raising and lowering member 72 by a clutch or the like, this embodiment is applicable. Further, the image forming apparatus 100 capable of forming a multi-color image is described as an example, but this embodiment is applicable to even an image forming apparatus capable of forming a monochromatic (single-color) image.

As described above, according to this embodiment, by a small-sized and in expensive constitution, it is possible to suppress the collision noise generating in the case where the power source is turned on without removing the holding member for transportation.

In the above-described embodiments, the case where the intermediate plate 71 of the stacking device 70 is held by the holding member 81 was described. However, the present invention is not limited thereto. For example, the present invention is also applicable to even such a constitution that for the purpose of deforming the secondary transfer roller 20 or the opposite roller 12 by pressure, the secondary transfer roller 20 and the opposite roller 12 are spaced from each other by a holding member during transportation. This is holding member is detachably mountable to the image forming apparatus 100, and is removed before use of the apparatus similarly as in the case of the holding member 81 for the intermediate plate 71.

Figure 9:
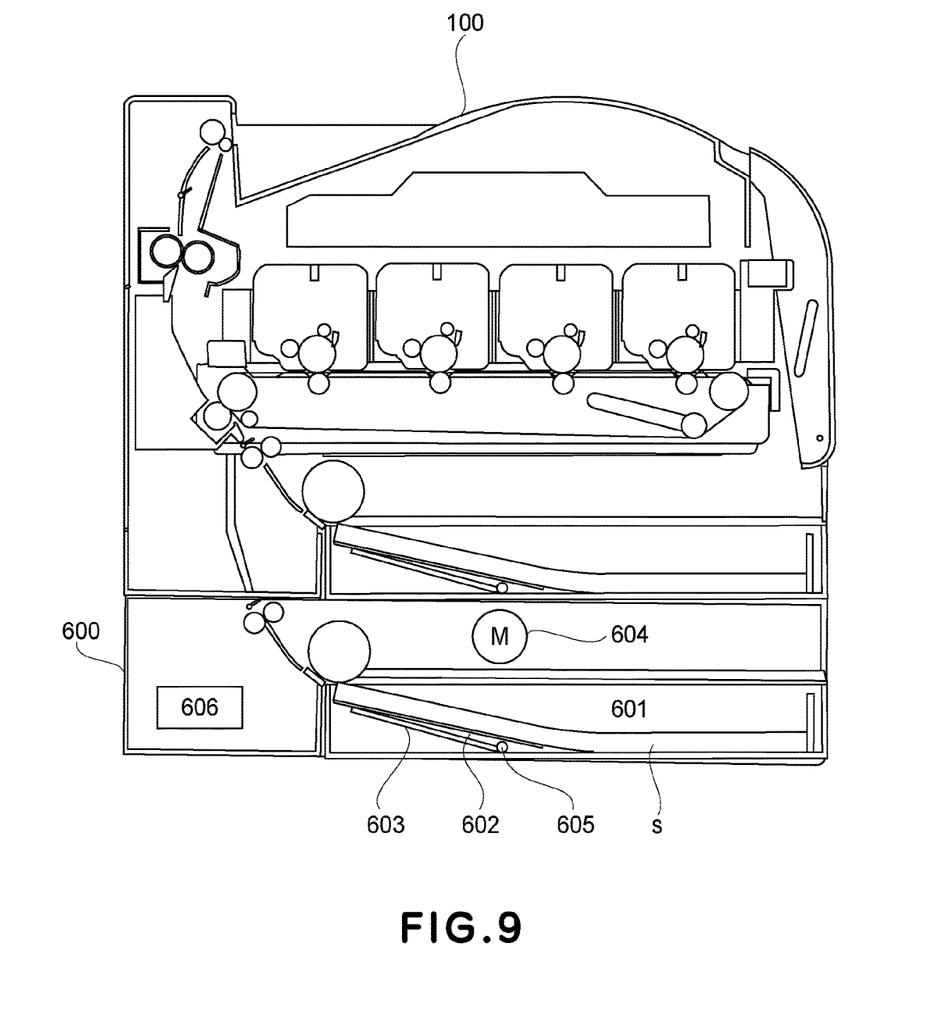
FIG. 9 is a sectional view showing a recording material feeding device in a modified embodiment.

In the above-described embodiments, the image forming apparatus 100 was described, but the present invention is not limited thereto. The present invention is also applicable to even a paper feeding option device 600 (recording material feeding device) mountable to an image forming apparatus 100 as shown in FIG. 9. The paper feeding option device 600 feeds recording paper S to the image forming apparatus 100 in a state in which the paper feeding option device 600 is mounted to the image forming apparatus 100. Also to the paper feeding option device 600, similarly as in the case of the image forming apparatus 100, a stacking device 601 which is a stacking portion where the recording paper S is accommodated is detachably mounted. A constitution of the stacking device 601 is basically the same as the constitution of the stacking device 70 and includes an intermediate plate 602 on which the recording paper S is stacked and a raising and lowering member 603 for raising the intermediate plate 602. The paper feeding option device 600 is provided with an intermediate plate motor 604, and the intermediate plate motor 604 drives the raising and lowering member 603. A torque limiter 605 for eliminating an overload generating in the intermediate plate motor 604 is provided between the intermediate plate motor 604 and the raising and lowering member 603. As the torque limiter 605, a torque limiter similar to the torque limiter 500 shown in FIG. 3 is employed. Further, a paper feeding option controller 606 provided in the paper feeding option device 600 carries out control shown in the flowcharts of FIG. 6 or FIG. 8.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a Divisional of U.S. patent application Ser. No. 15/160,092, filed May 20, 2016, which claims the benefit of Japanese Patent Applications No. 2015-107500 filed on May 27, 2015, and 2016-058662 filed on Mar. 23, 2016, which are hereby incorporated by reference herein in their entireties.

What is claimed is:

1. A recording material feeding device comprising:
   a plate on which a recording material is stacked;
   a moving member configured to move a position of the plate;
   a motor configured to rotate for driving the moving member;
   a holding member configured to hold the position of the plate, the holding member being different from the moving member;
   a torque limiter configured to limit transmission of a driving torque from the motor to the moving member so as to permit the transmission until a torque exerted on the motor reaches a predetermined torque and so as to stop the transmission of the driving torque when the torque exceeds the predetermined torque, in a case that the motor rotates in a state in which the holding member holds the position of the plate;
   a storing portion configured to store information on a holding state of the holding member; and
   a controller configured to control the motor to rotate at a rotational speed slower when the information stored in the storing portion is information indicating that the holding member holds the position of the plate than when the information stored in the storing portion is information indicating that the holding member does not hold the position of the plate.

2. The recording material feeding device according to claim 1, wherein the plate is detachably mountable to the recording material feeding device, and the holding member moves from a position where the holding member holds the position of the plate to a position where the holding member does not hold the position of the plate with removal of the plate from the recording material feeding device.

3. The recording material feeding device according to claim 2, further comprising a first detecting portion configured to detect whether or not the plate is mounted in the recording material feeding device,
   wherein in a state in which the information indicating that the holding member holds the position of the plate is stored in the storing portion, when the first detecting portion detects that the plate is not mounted, the controller causes the storing portion to store the information indicating that the holding member does not hold the position of the plate.

4. The recording material feeding device according to claim 1, further comprising a feeding member configured to feed the recording material stacked on the plate in a case that the plate is moved to a first position by the moving member,
   wherein the holding member holds the plate at a second position different from the first position.

5. The recording material feeding device according to claim 4, wherein the plate is raised by the moving member, and the holding member holds the plate at the second position below the first position with respect to a vertical direction.

6. The recording material feeding device according to claim 4, further comprising a second detecting portion configured to detect whether or not the recording material stacked on the plate or the plate is moved to the first position,
wherein in a state in which the information indicating that the holding member holds the position of the plate is stored in the storing portion, when the second detecting portion detects that the recording material or the plate is moved to the first position, the controller causes the storing portion to store the information indicating that the holding member does not hold the position of the plate.

7. The recording material feeding device according to claim 6, wherein in the state in which the information indicating that the holding member does not hold the position of the plate is stored in the storing portion, when the second detecting portion does not detect that the recording material or the plate is moved to the first position in a period from start of rotation of the motor until a first predetermined time elapses, the controller stops the motor, and
wherein in a state in which the information indicating that the holding member holds the position of the plate is stored in the storing portion, when the second detecting portion does not detect that the recording material or the plate is moved to the first position in a period from start of rotation of the motor until a second predetermined time longer than the first predetermined time elapses, the controller stops the motor.

8. The recording material feeding device according to claim 7, further comprising a display portion configured to display the information indicating that the holding member holds the position of the plate when the second detecting portion does not detect that the recording material or the plate is moved to the first position in the period from start of rotation of the motor until the second predetermined time elapses.

9. The recording material feeding device according to claim 1, wherein the holding member fixes the position of the plate.

10. The recording material feeding device according to claim 1, wherein the holding member is detachably mountable to the recording material feeding device.

11. The recording material feeding device according to claim 1, wherein at timing when a power source of the recording material feeding device is turned on, the information indicating that the holding member holds the position of the plate is stored in the storing portion.

12. The recording material feeding device according to claim 1, wherein the storing portion is a nonvolatile storing portion configured to store the information on the holding state of the holding member.

13. The recording material feeding device according to claim 1, wherein the torque limiter includes a first gear rotatable with rotation of the motor, a second gear engageable with the first gear on an inclined surface, and a spring configured to apply a force in a direction of engaging the first gear and the second gear, and
wherein when the torque exerted on the motor is smaller than the predetermined torque, the first gear and the second gear are engaged by the spring and the second gear is rotated with rotation of the first gear thereby to transmit the driving torque to the moving member, and
wherein when the torque is larger than the predetermined torque, engagement of the first gear and the second gear by the spring is eliminated and the second gear is not rotated with rotation of the first gear thereto to stop the transmission of the driving torque.

* * * * *